(12) United States Patent
Choi et al.

(10) Patent No.: US 11,608,955 B2
(45) Date of Patent: Mar. 21, 2023

(54) LAMP FOR VEHICLE

(71) Applicant: SL Corporation, Daegu (KR)

(72) Inventors: Nak Jung Choi, Gyeongsan-si (KR);
Jong Woon Kim, Gyeongsan-si (KR);
Jeong Su Lee, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/539,733

(22) Filed: Dec. 1, 2021

(65) Prior Publication Data

US 2022/0196220 A1 Jun. 23, 2022

(30) Foreign Application Priority Data

Dec. 22, 2020 (KR) .................. 10-2020-0180629

(51) Int. Cl.
*F21S 41/33* (2018.01)
*F21S 41/265* (2018.01)
(Continued)

(52) U.S. Cl.
CPC ........... *F21S 41/336* (2018.01); *F21S 41/147* (2018.01); *F21S 41/265* (2018.01); *B60Q 2400/00* (2013.01); *B60Q 2400/50* (2013.01); *F21S 41/20* (2018.01); *F21S 41/25* (2018.01); *F21S 41/26* (2018.01); *F21S 41/27* (2018.01); *F21S 41/275* (2018.01); *F21S 41/285* (2018.01); *F21S 41/33* (2018.01); *F21S 41/331* (2018.01); *F21S 41/332* (2018.01); *F21S 41/333* (2018.01); *F21S 41/334* (2018.01); *F21S 41/335* (2018.01); *F21S 41/337* (2018.01); *F21S 41/338* (2018.01);
(Continued)

(58) Field of Classification Search
CPC ........ F21S 41/33; F21S 41/331; F21S 41/332; F21S 41/333; F21S 41/334; F21S 41/335; F21S 41/336; F21S 41/337; F21S 41/338; F21S 41/20; F21S 41/25; F21S 41/26; F21S 41/265; F21S 41/27; F21S 41/275; F21S 41/285; F21S 41/40; F21S 41/43; B60Q 2400/00; B60Q 2400/50; F21W 2103/60
See application file for complete search history.

(56) References Cited

U.S. PATENT DOCUMENTS 1,618,010 A * 2/1927 Hoss .................. F21S 41/337
362/348
10,557,610 B1 * 2/2020 Lim .................... F21S 43/40
(Continued)

FOREIGN PATENT DOCUMENTS

DE 102018101991 B3 * 5/2019 ............ F21S 41/147
EP 3572719 A1 * 11/2019 ............ F21S 41/141
WO WO-2021060200 A1 * 4/2021

*Primary Examiner* — Colin J Cattanach
(74) *Attorney, Agent, or Firm* — United One Law Group LLC; Kongsik Kim; Jhongwoo Peck

(57) ABSTRACT

A lamp for a vehicle includes a light emitting unit for generating light, and an optical unit for forming a predetermined light irradiation pattern by outputting the light incident from the light emitting unit through a plurality of optical modules each including an incident lens and an output lens. The light emitting unit includes a light source unit, and a plurality of reflectors arranged in a left-right direction to allow the light generated from the light source unit to be reflected to the optical unit, and the optical unit includes a plurality of areas for outputting the light incident from the plurality of reflectors.

15 Claims, 15 Drawing Sheets

(51) Int. Cl.
*F21S 41/147* (2018.01)
*F21S 41/26* (2018.01)
*F21S 41/27* (2018.01)
*F21S 41/40* (2018.01)
*F21S 41/20* (2018.01)
*F21S 41/25* (2018.01)
*F21W 103/60* (2018.01)
*F21S 41/43* (2018.01)
*F21S 41/275* (2018.01)
*F21V 5/00* (2018.01)
*F21V 7/00* (2006.01)
*F21V 7/04* (2006.01)
*F21V 7/09* (2006.01)

(52) U.S. Cl.
CPC ............... *F21S 41/40* (2018.01); *F21S 41/43* (2018.01); *F21V 5/002* (2013.01); *F21V 5/003* (2013.01); *F21V 5/004* (2013.01); *F21V 7/0025* (2013.01); *F21V 7/048* (2013.01); *F21V 7/09* (2013.01); *F21W 2103/60* (2018.01)

(56) References Cited

U.S. PATENT DOCUMENTS

| | | | |
|---|---|---|---|
| 10,612,741 B2* | 4/2020 | Moser | F21S 41/265 |
| 11,047,543 B1* | 6/2021 | Potter | F21S 41/10 |
| 11,054,103 B2* | 7/2021 | Choi | F21S 41/43 |
| 2004/0136196 A1* | 7/2004 | Akiyama | F21S 43/14 |
| | | | 362/487 |
| 2018/0106450 A1* | 4/2018 | Kamau | F21V 5/002 |
| 2021/0325016 A1* | 10/2021 | Moser | F21S 41/663 |
| 2021/0341123 A1* | 11/2021 | Mototsuji | F21S 41/322 |

* cited by examiner

FIG. 15
| OPTICAL UNIT | OPTICAL MODULE |
|---|---|
| FIRST AREA (A1) | 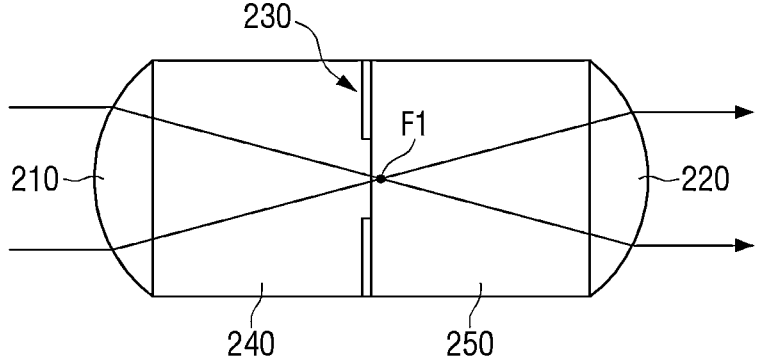 |
| SECOND AREA (A2) | 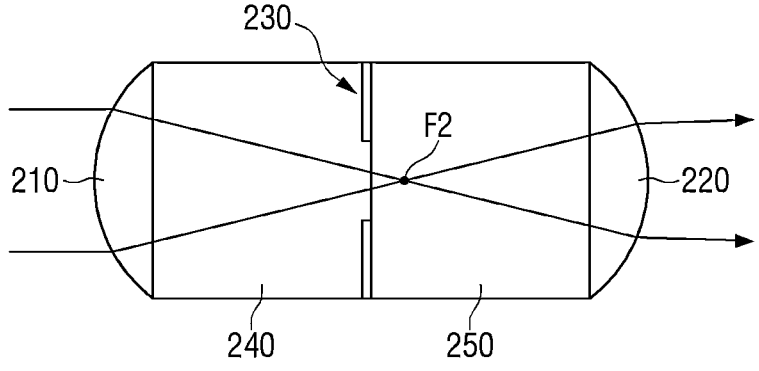 |
| THIRD AREA (A3) | 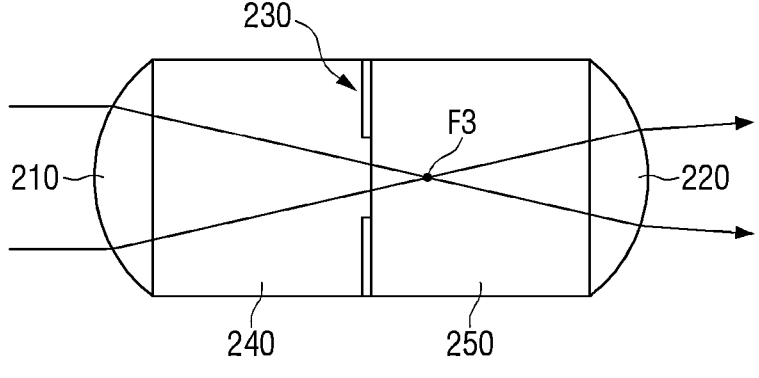 |

LAMP FOR VEHICLE

CROSS-REFERENCE TO RELATED APPLICATION

This application claims priority to Korean Application No. 10-2020-0180629 filed on Dec. 22, 2020, which application is incorporated herein by reference in its entirety.

BACKGROUND

1. Technical Field

The present disclosure relates to a vehicle lamp, and more particularly, to a vehicle lamp capable of forming a light irradiation pattern including a plurality of pattern images from a simplified configuration.

2. Description of the Related Art

In general, vehicles are equipped with various types of lamps having an illumination function for easily identifying an object located around the vehicle during low-light condition (e.g., night-time driving) and a signaling function for notifying a driver of a surrounding vehicle or a pedestrian of the driving state of the vehicle.

For example, head lamps and fog lamps are mainly for the purpose of illumination function, and turn signal lamps, tail lamps and brake lamps are mainly for the purpose of signaling function, and each lamp should meet its installation standards and specifications stipulated by law to fully demonstrate its functions.

Recently, research has been actively conducted to reduce the size of a lamp using a micro lens having a relatively short focal length. In this case, a light irradiation pattern having a required shape or size is formed by the light outputted from several micro lenses.

In this case, when the light irradiation pattern includes a plurality of pattern images, it is necessary to separately provide an optical system for forming each pattern image, which makes the configuration to become complicated and the cost to increase. Therefore, a means to form a light irradiation pattern including a plurality of pattern images while simplifying the configuration is required.

SUMMARY

An aspect of the present disclosure provides a vehicle lamp that can easily form a plurality of pattern images without separately providing an optical system for forming each pattern image.

The aspects of the present disclosure are not limited to those mentioned above, and other aspects not mentioned will be clearly understood by those skilled in the art from the following description.

According to an aspect of the present disclosure, a lamp for a vehicle may include a light emitting unit for generating light; and an optical unit for forming a predetermined light irradiation pattern by outputting the light incident from the light emitting unit through a plurality of optical modules each including an incident lens and an output lens. The light emitting unit may include a light source unit, and a plurality of reflectors arranged in a left-right direction to allow the light generated from the light source unit to be reflected to the optical unit, and the optical unit may include a plurality of areas for outputting the light incident from the plurality of reflectors.

Each of the plurality of reflectors may reflect the light generated from the light source unit to become parallel light. Lights reflected by the plurality of reflectors may have different angles with respect to a horizontal direction. For example, a first light that is irradiated farther from the vehicle than a second light among the lights reflected by the plurality of reflectors may form an angle with respect to the horizontal direction greater than an angle formed by the second light.

An optical module among the plurality of optical modules included in the plurality of areas may output the light in a direction parallel to a direction in which the light is reflected by a corresponding reflector among the plurality of reflectors.

Incident lenses of at least some of the plurality of optical modules included in the plurality of areas may have focal points formed at different positions.

The plurality of areas may be arranged in the left-right direction in accordance with an arrangement direction of the plurality of reflectors.

Light outputted from an area closest to the light source unit among the plurality of areas may be irradiated to farthest from the vehicle.

Shapes of at least one of the incident lens or the output lens of at least some of the plurality of optical modules included in the plurality of areas may be different in at least one direction with respect to a reference line.

Each of the plurality of optical modules may further comprise a shield disposed between the incident lens and the output lens to obstruct at least some of the light incident to the incident lens from being transmitted to the output lens. A first incident lens of a first optical module included in one of the plurality of areas may have a focal point formed at a different position in a front-rear direction with respect to the shield than a second incident lens of a second optical module included in another of the plurality of areas. For example, the first incident lens of the first optical module that irradiates the light at a closer distance from the vehicle than the second optical module that irradiates the light at a farther distance from the vehicle may have the focal point formed at a position having a greater distance forward with respect to the shield than the second incident lens.

The shield included in each of the plurality of optical modules may include a blocking area to obstruct the at least some of the light; and a transmission area to transmit at least some of a remainder of the light. The transmission area of a first shield included in the first optical module may be larger than the transmission area of a second shied included in the second optical module.

According to the vehicle lamp of the present disclosure as described above, one or more of the following effects may be achieved.

Depending on the position where each of the plurality of pattern images included in the light irradiation pattern is formed, some portions of the plurality of optical modules may output the light in different directions from other portions, allowing the configuration to be more simplified and a plurality of pattern images to be more easily formed.

In addition, when a plurality of pattern images are formed at different positions, the sizes of the transmission areas of the shields for forming the pattern images may be made differently from one another so that the plurality of pattern images may have a substantially uniform size even when they are formed at different positions with respect to the vehicle.

In addition, when a plurality of pattern images are formed at different positions, since the optical modules for forming the pattern images have different focal points of the incident lens, the plurality of pattern images may have substantially uniform sizes and brightness regardless of the distance from the vehicle.

Advantages of the present disclosure are not limited to those mentioned above, and other advantageous effects will be clearly understood by those skilled in the art from the description in the present disclosure.

BRIEF DESCRIPTION OF THE DRAWINGS

These and/or other aspects will become apparent and more readily appreciated from the following description of the exemplary embodiments, taken in conjunction with the accompanying drawings in which:

FIG. 15 is a schematic diagram illustrating a focal point of an incident lens in each of a plurality of areas of an optical unit according to an exemplary embodiment of the present disclosure.

DETAILED DESCRIPTION

Figure 1:
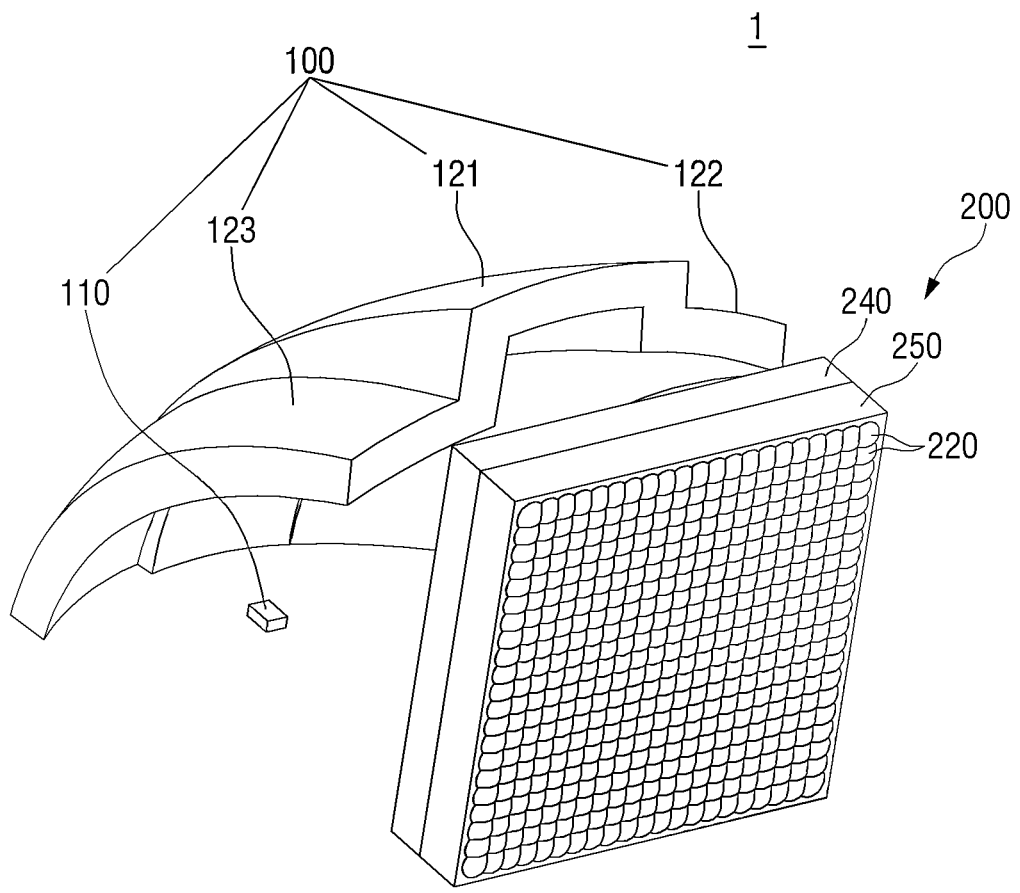
FIGS. 1 and 2 are perspective views showing a vehicle lamp according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

Therefore, in some exemplary embodiments, well-known processes, well-known structures and well-known technologies will not be specifically described in order to avoid ambiguous interpretation of the present disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated component, steps, operations, and/or elements, but do not preclude the presence or addition of one or more other components, steps, operations, elements, and/or groups thereof. As used herein, the term "and/or" includes any and all combinations of one or more of the associated listed items.

Exemplary embodiments of the disclosure are described herein with reference to cross-section and/or schematic illustrations that are illustrations of idealized exemplary embodiments. As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. In addition, each element illustrated in figures of the present disclosure may have been enlarged or reduced for ease of description. Throughout the specification, like reference numerals in the drawings denote like elements.

Hereinafter, the present disclosure will be described with reference to the drawings for describing a vehicle lamp according to exemplary embodiments of the present disclosure.

Figure 2:
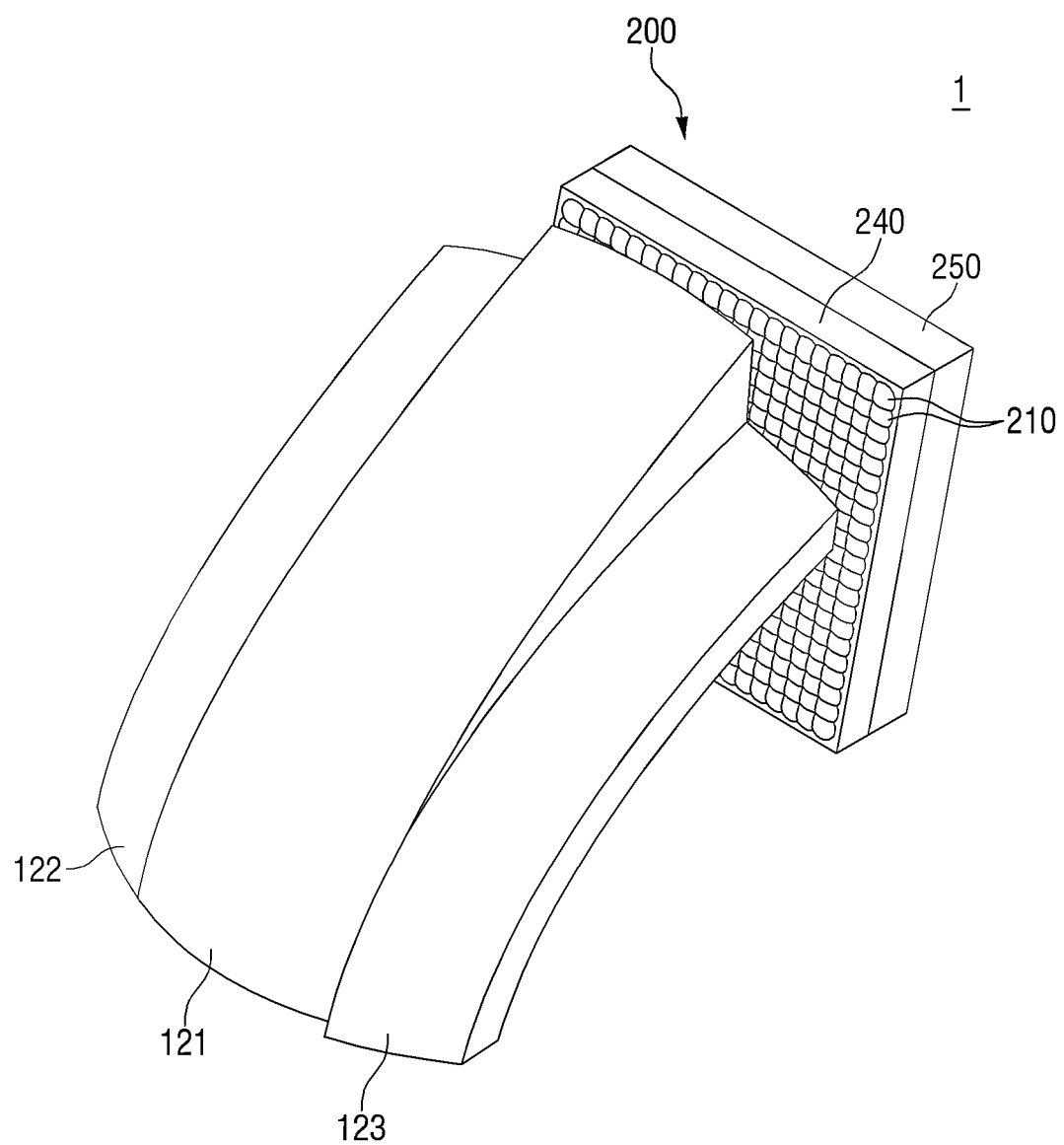
Figure 3:
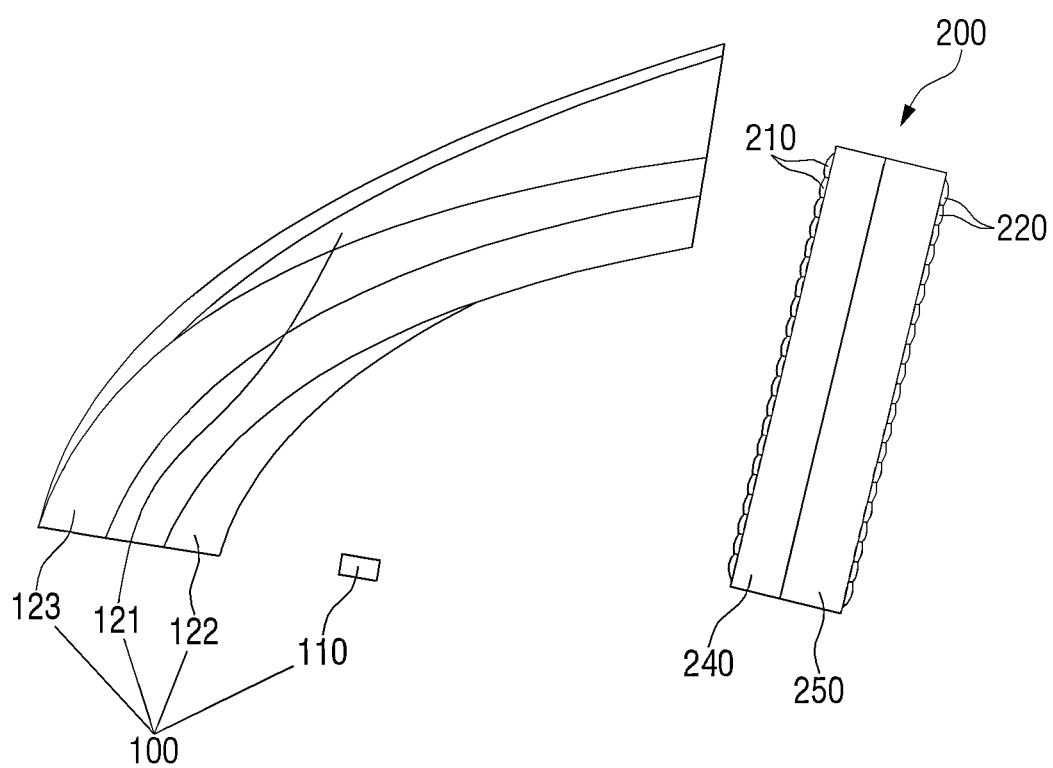
FIG. 3 is a side view showing a vehicle lamp according to an exemplary embodiment of the present disclosure.

FIGS. 1 and 2 are perspective views illustrating a vehicle lamp according to an exemplary embodiment of the present disclosure, and FIG. 3 is a side view illustrating a vehicle lamp according to an exemplary embodiment of the present disclosure. Referring to FIGS. 1 to 3, a vehicle lamp 1 according to an exemplary embodiment of the present disclosure may include a light emitting unit 100 and an optical unit 200. The light emitting unit 100 and the optical unit 200 may be accommodated in an interior space formed by a lamp housing (not shown) and a cover lens (not shown) coupled to the lamp housing for irradiating light to the outside of the vehicle.

In an exemplary embodiment of the present disclosure, the vehicle lamp 1 may be used for various functions including an illumination function such as a head lamp to secure the driver's view when the vehicle is operating in low-light conditions (e.g., at night), a signaling function such as a position lamp, a daytime running lamp, a turn signal lamp, and a brake lamp to inform the driving state of the vehicle to drivers of surrounding vehicles or pedestrians, and a function to form an image representing various information for drivers or pedestrians on the road surface around the vehicle. The vehicle lamp 1 of the present disclosure may be used for a single function among the above-mentioned functions or may be used for two or more functions.

Although the case where the vehicle lamp 1 of the present disclosure is used for a function to form a light irradiation pattern including a plurality of pattern images having a shape of a predetermined size on the road surface around the vehicle will be described hereinbelow as an example, the present disclosure is not limited thereto, and the description may be similarly applied to embodiments in which the vehicle lamp 1 of the present disclosure forms a light irradiation pattern for an illumination function or a signaling function.

In addition, in the exemplary embodiment of the present disclosure, the light emitting unit 100 and the optical unit 200 may be arranged as being inclined at a predetermined angle toward the road surface with respect to the horizontal direction to allow a light irradiation pattern including a plurality of pattern images having a shape of a predetermined size to be more easily formed on the road surface around the vehicle. However, the present disclosure is not limited thereto, and the light emitting unit 100 and the optical unit 200 may be inclined at various angles based on the applications.

The light emitting unit 100 may generate light having a color and/or brightness suitable for the function of the vehicle lamp 1 of the present disclosure, and the light generated from the light emitting unit 100 may progress to be incident on the optical unit 200 disposed in front of the light emitting unit 100.

The light emitting unit 100 may include a light source unit 110 and a plurality of reflectors 121, 122, and 123. The plurality of reflectors 121, 122, and 123 may be arranged in the left-right direction and may reflect the light beams generated from the light source unit 110 to cause them to proceed with angles different from one another with respect to the horizontal direction.

The light source unit 110 may include at least one light source that generates light having a color and/or brightness suitable for the function of the vehicle lamp 1 of the present disclosure. In the exemplary embodiment of the present disclosure, a semiconductor light emitting device such as a light emitting diode (LED) may be used, but the present disclosure is not limited thereto. Not only the LED, but also various types of light sources such as bulbs and laser diodes (LDs) may be used, and depending on the type of light source, optical elements such as mirrors, prisms, lenses, reflectors, and the like that affect properties of light such as brightness or path thereof may be additionally used.

The plurality of reflectors 121, 122, and 123 may reflect the light generated from the light source unit 110 at different angles. This configuration may allow the light reflected by the plurality of reflectors 121, 122, and 123 to be irradiated to positions having different distances from the vehicle when projected on the road surface around the vehicle so that the light irradiation pattern formed by the vehicle lamp 1 of the present disclosure may include a plurality of pattern images.

In addition, the light reflected by each of the plurality of reflectors 121, 122, and 123 may be converted into a parallel light beam and incident on the optical unit 200. This is to ensure that the light reflected by the plurality of reflectors 121, 122, and 123 is uniformly incident across the entire incident area.

Hereinafter, the reflector 121 disposed in the middle among the plurality of reflectors 121, 122, and 123 is referred to as a first reflector 121, and the reflectors 122 and 123 disposed on both sides of the first reflector 121 are referred to as a second reflector 122 and a third reflector 123, respectively.

In the exemplary embodiment of the present disclosure, a case in which the light emitting unit 100 includes three reflectors 121, 122, and 123 is described as an example. This corresponds to a configuration where a light irradiation pattern formed by the vehicle lamp 1 of the present disclosure includes three pattern images. The number of reflectors included in the light emitting unit 100 may vary according to the number of pattern images included in the light irradiation pattern.

Figure 4:
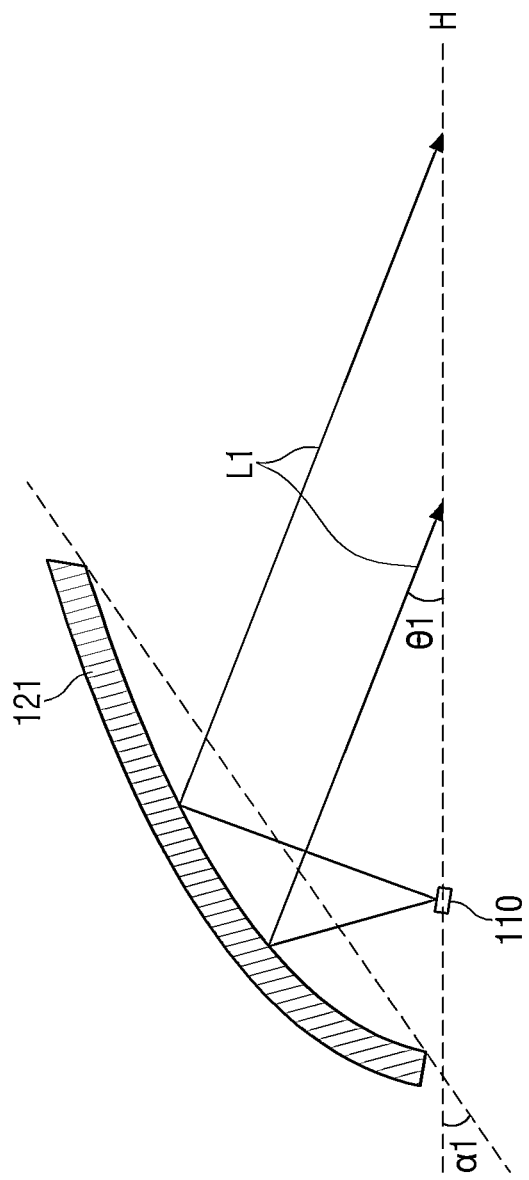
FIG. 4 is a schematic diagram illustrating light reflected by a first reflector according to an exemplary embodiment of the present disclosure.
Figure 5:
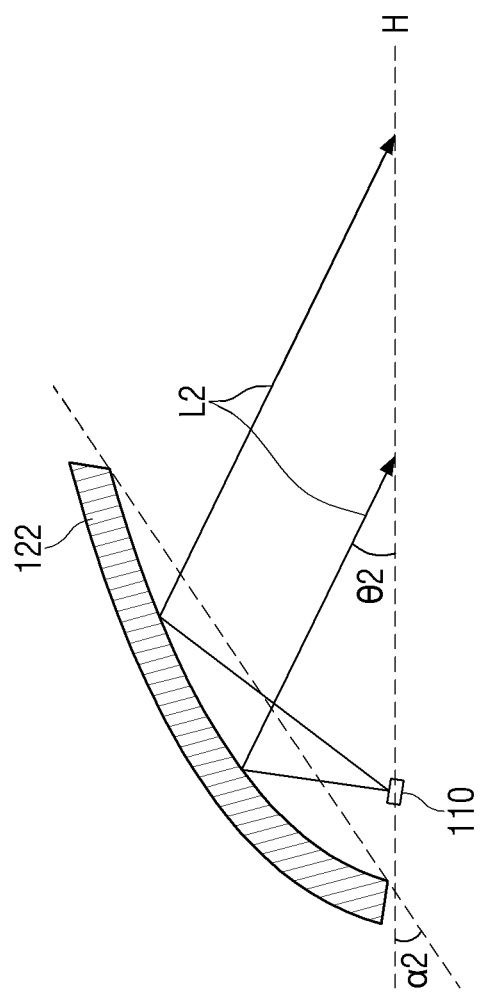
FIG. 5 is a schematic diagram illustrating light reflected by a second reflector according to an exemplary embodiment of the present disclosure.
Figure 6:
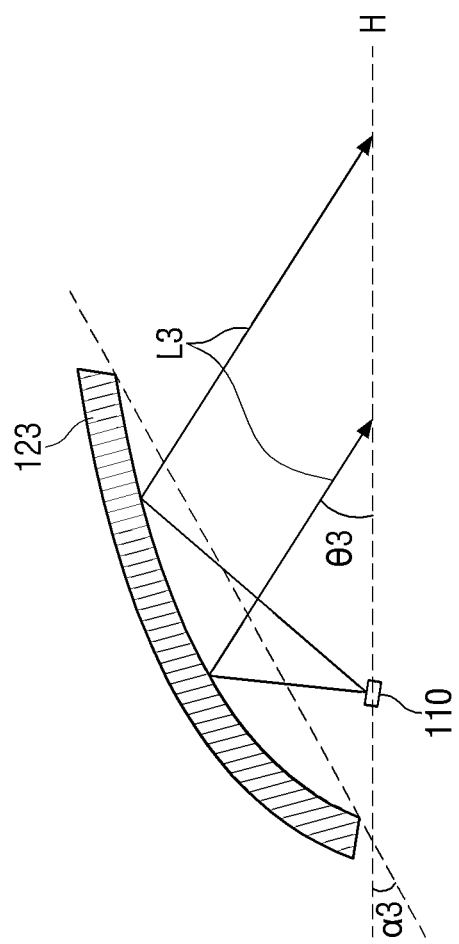
FIG. 6 is a schematic diagram illustrating light reflected by a third reflector according to an exemplary embodiment of the present disclosure.

FIG. 4 is a schematic diagram showing light reflected by the first reflector 121 according to an exemplary embodiment of the present disclosure, FIG. 5 is a schematic diagram showing light reflected by the second reflector 122 according to an exemplary embodiment of the present disclosure, and FIG. 6 is a schematic diagram showing light reflected by the third reflector 123 according to an exemplary embodiment of the present disclosure.

Referring to FIGS. 4 to 6, the light L1 that is reflected by the first reflector 121 among the light generated from the light source unit 110 may proceed with a first angle $\theta 1$ with respect to the horizontal direction H, the light L2 that is reflected by the second reflector 122 among the light generated from the light source unit 110 may proceed with a second angle $\theta 2$ with respect to the horizontal direction H, and the light L3 that is reflected by the third reflector 123 among the light generated from the light source unit 110 may proceed with a third angle $\theta 3$ with respect to the horizontal direction H.

At this time, the angles of the light L1, L2, and L3 that are reflected by each of the first to third reflectors 121, 122, and 123 may have a relationship of $\theta 1 < \theta 2 < \theta 3$ with respect to the horizontal direction H. This configuration allows the light L1 that is reflected by the first reflector 121 to be irradiated to the position farthest from the vehicle, as it is reflected to have the smallest angle with respect to the horizontal direction H, and the light L3 that is reflected by third reflector 123 to be irradiated to the position nearest from the vehicle, as it is reflected to have the largest angle with respect to the horizontal direction H.

In addition, the light L1 that is reflected by the first reflector 121 may be irradiated to the position farthest from the vehicle, among the plurality of areas A1, A2, and A3 of the optical unit 200 (see FIG. 9 which will be discussed below) since the area A1 corresponding to the first reflector 121 is disposed closest to the light source unit 110, and thus light having a relatively high luminous intensity may be incident to the area A1.

The first to third reflectors 121, 122, and 123 may be formed to have different curvatures, or lines connecting both ends in the front-rear direction may be positioned to have different angles $\alpha 1$, $\alpha 2$, and $\alpha 3$ with respect to the horizontal direction H so that the light generated from the light source unit 110 may be reflected in directions having different angles. In this case, the angle $\alpha 1$ between the line connecting both ends of the first reflector 121 and the horizontal direction H may be the greatest, and the angle $\alpha 3$ between the line connecting both ends of the third reflector 123 and the horizontal direction H may be the smallest.

As described above, when the first to third reflectors 121, 122, and 123 are arranged in the left-right direction, each of the first to third reflectors 121, 122, and 123 may be formed to have a size corresponding to the optical unit 200 in the vertical direction. This configuration may prevent the occurrence of chromatic aberration when the lights reflected by points located at different distances in the vertical direction from the light source unit 110 are mixed, and reflected by each of the first to third reflectors 121, 122, and 123, and outputted through the optical unit 200.

The optical unit 200 may allow some of the light incident from the light emitting unit 100 to be outputted in different directions from others so that the light irradiation pattern formed by the vehicle lamp 1 of the present disclosure may include a plurality of pattern images.

Figure 7:
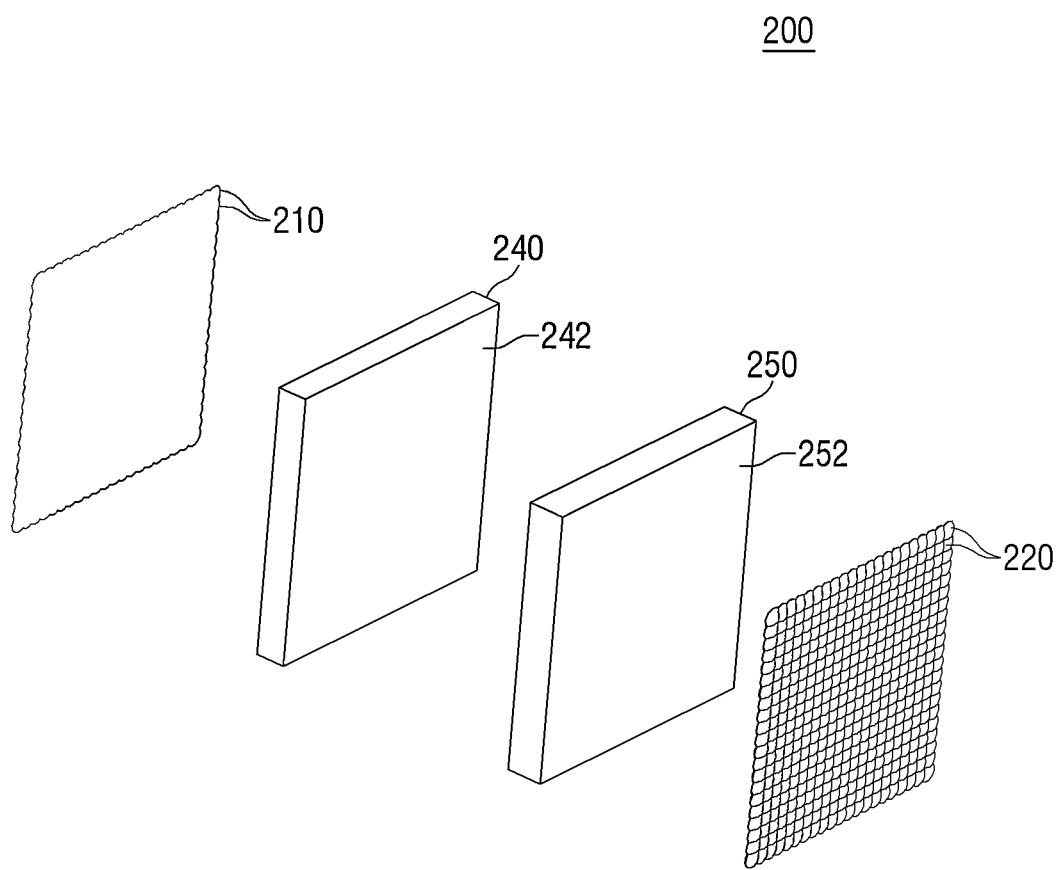
FIGS. 7 and 8 are exploded perspective views showing an optical unit according to an exemplary embodiment of the present disclosure.
Figure 8:
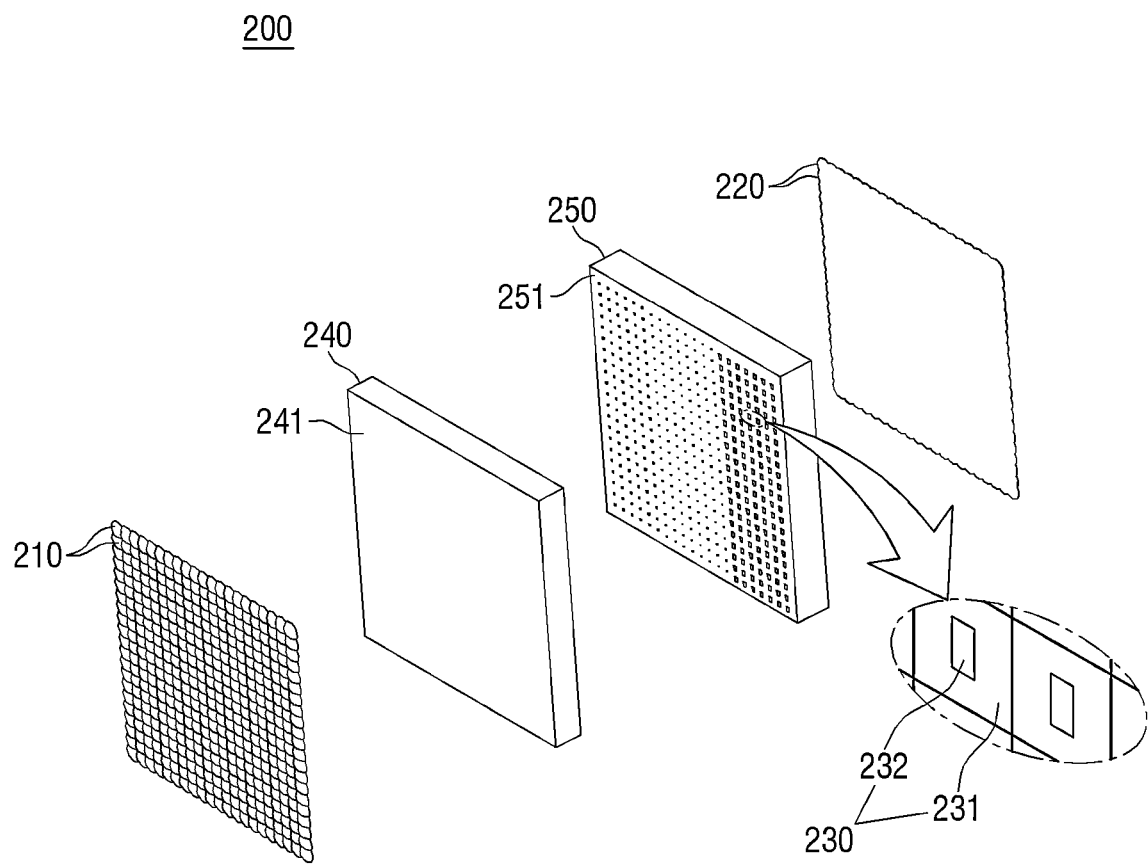

FIGS. 7 and 8 are exploded perspective views illustrating the optical unit 200 according to an exemplary embodiment of the present disclosure. Referring to FIGS. 7 to 8, the optical unit 200 according to an exemplary embodiment of the present disclosure may include a plurality of incident lenses 210, a plurality of output lenses 220, and a plurality of shields 230.

The light that is incident from the light emitting unit 100 to each of the plurality of incident lenses 210 may progress to an output lens corresponding to each of the plurality of incident lenses 210 among the plurality of output lenses 220 and subsequently be emitted. Each of the plurality of shields 230 may obstruct at least some of the light progressing to each of the plurality of output lenses 220 based on the shape and/or size of the light irradiation pattern formed by the vehicle lamp 1 of the present disclosure.

Hereinafter, among the plurality of incident lenses 210, the plurality of output lenses 220, and the plurality of shields 230, an incident lens, an output lens, and a shield that correspond to one another will be referred to as an optical module. As such, the optical unit 200 may be understood to include a plurality of optical modules arranged in a matrix form.

The plurality of incident lenses 210 may be arranged on the incident surface 241 of the first optical member 240 made of a material such as glass through which light is transmittable, and the plurality of output lenses 220 may be arranged on the output surface 252 of the second optical member 250 made of a material through which light is transmittable, like the first optical member 240. The first optical member 240 and the second optical member 250 may be arranged in the front-rear direction so that the output surface 242 of the first optical member 240 and the incident surface 251 of the second optical member 250 may face each other.

In the exemplary embodiment of the present disclosure, a case in which the plurality of shields 230 are formed on the incident surface 251 of the second optical member 250 will be described as an example, but this is merely an example. The present disclosure is not limited thereto, and the plurality of shields 230 may be formed on at least one surface of any one of the first optical member 240 and the second optical member 250 depending on the position of a focal point between the corresponding incident and output lenses among the plurality of incident lenses 210 and the plurality of output lenses 220.

In addition, in the exemplary embodiment of the present disclosure, although a case in which a single shield is disposed between the incident lens and the corresponding output lens is described as an example. However, the present disclosure is not limited thereto, and two or more shields may be arranged in the front-rear direction between the incident lens and the corresponding output lens, depending on the light irradiation pattern formed by the vehicle lamp 1 of the present disclosure.

On the other hand, in the exemplary embodiment of the present disclosure, although a case in which the plurality of incident lenses 210 and the plurality of output lenses 220 are formed to correspond one-to-one with each other so that light incident to any one of the plurality of incident lenses 210 is incident to any one of the plurality of output lenses 220 is described as an example. However, the present disclosure is not limited thereto, and the plurality of incident lenses 210 and the plurality of output lenses 220 may be formed to correspond to each other in one-to-one, one-to-many, many-to-one, many-to-many, or the like based on the size, shape, brightness, etc. of the light irradiation patterns formed by the vehicle lamp 1 of the present disclosure. Examples of the plurality of incident lenses 210 and the plurality of output lenses 220 corresponding one-to-many, many-to-one, or many-to-many can be found in U.S. Patent Application Publication No. 2019/0186706, which is incorporated herein by reference in its entirety.

In the above-described optical unit 200, some portions of the plurality of optical modules may output the light in different directions from other portions so that the light irradiation pattern formed by the vehicle lamp 1 of the present disclosure may include a plurality of pattern images formed at different positions.

Figure 9:
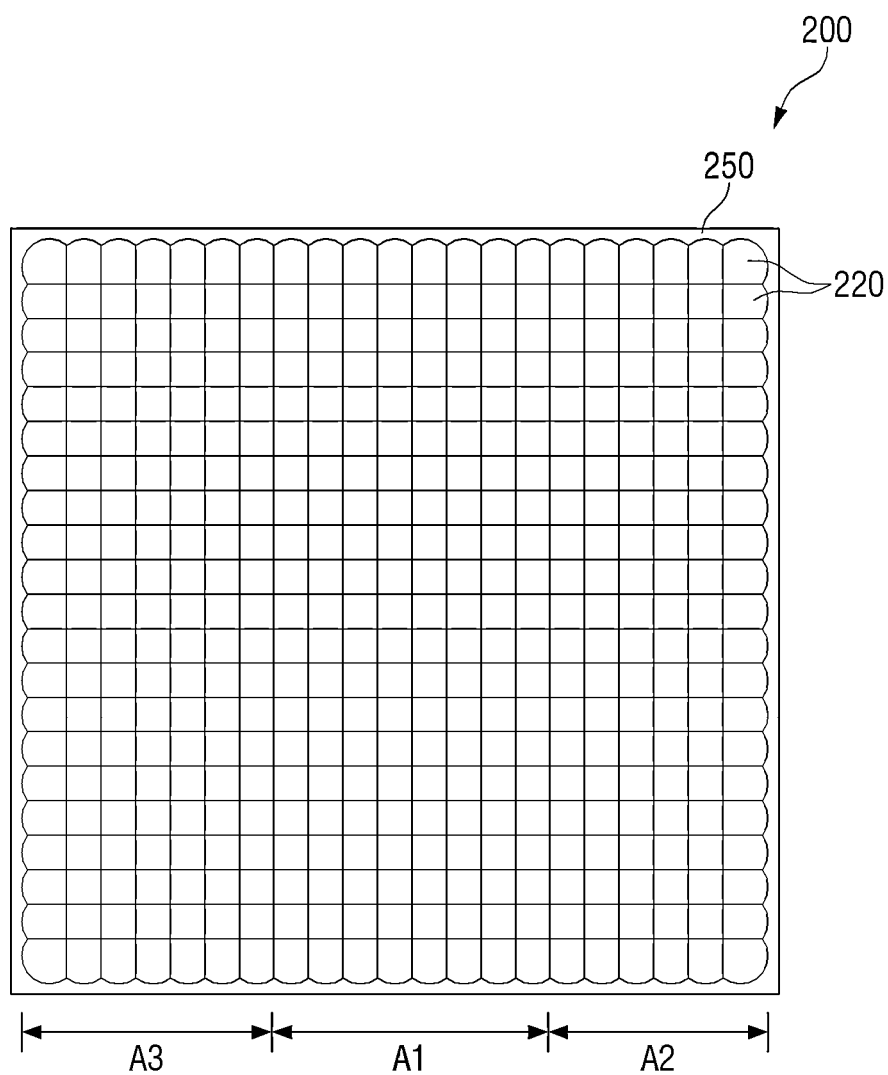
FIG. 9 is a schematic diagram illustrating a plurality of areas of an optical unit according to an exemplary embodiment of the present disclosure.

FIG. 9 is a schematic diagram illustrating a plurality of areas of the optical unit 200 according to an exemplary embodiment of the present disclosure, viewed from the front of the optical unit 200. Referring to FIG. 9, the optical unit 200 according to an exemplary embodiment of the present disclosure may be divided into a plurality of areas A1, A2, and A3 along the left-right direction, and directions in which the light is outputted from the optical modules belonging to each of the plurality of areas A1, A2 and A3 among the plurality of optical modules may be diverse.

Hereinafter, a case in which the plurality of areas A1, A2, and A3 include a first area A1 corresponding to the first reflector 121, a second area A2 corresponding to the second reflector 122, and a third area A3 corresponding to the third reflector 123 will be described as an example. However, the present disclosure is not limited thereto, and the number of areas may be varied depending on the number of reflectors.

Further, the optical unit 200 may be divided into three areas A1, A2, and A3 since the light irradiation pattern formed by the vehicle lamp 1 of the present disclosure includes three pattern images. However, the present disclosure is not limited thereto, and the optical unit 200 may be divided into two or more areas according to the number of pattern images included in the light irradiation pattern formed by the vehicle lamp 1 of the present disclosure.

The optical modules included in each of the first to third areas A1, A2, and A3 among the plurality of optical modules may output the light at different angles with respect to the horizontal direction H.

Figure 10:
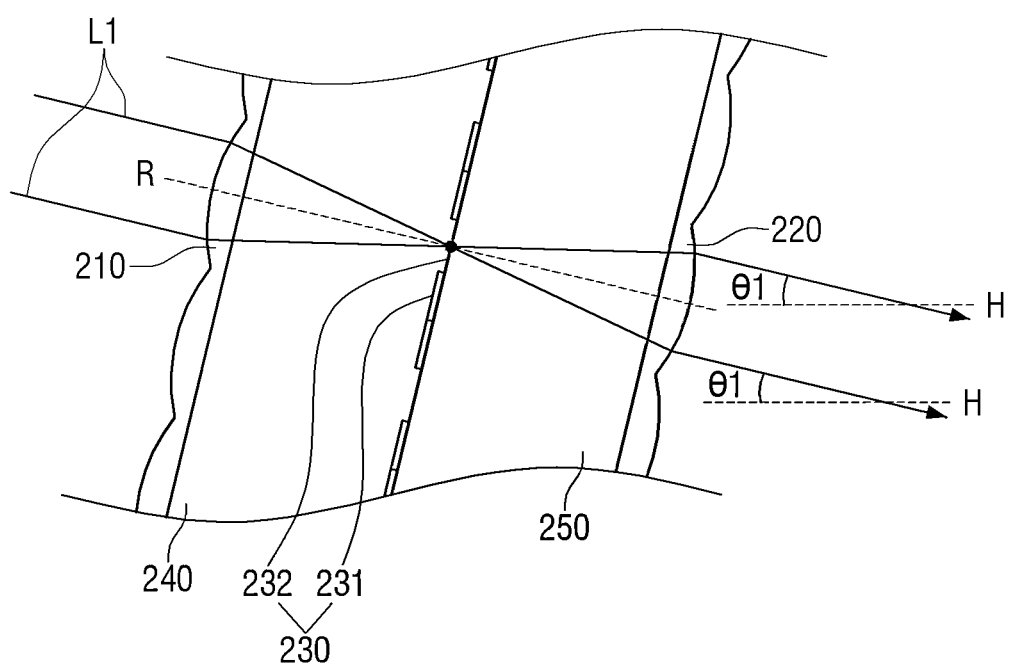
FIG. 10 is a schematic diagram illustrating light outputted from an optical module in a first area according to an exemplary embodiment of the present disclosure.
Figure 11:
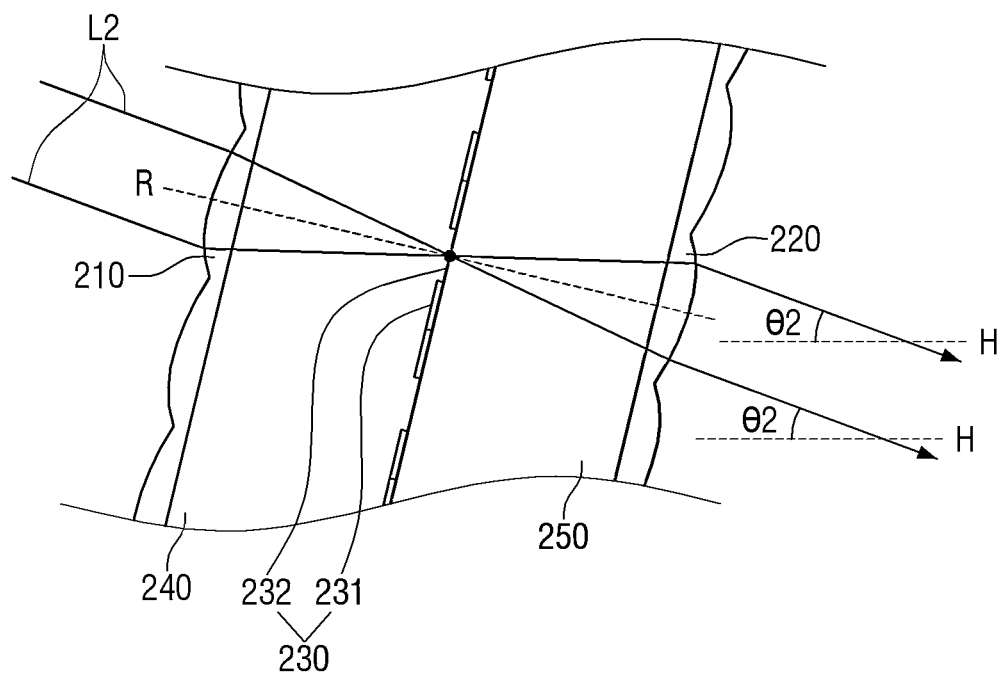
FIG. 11 is a schematic diagram illustrating light outputted from an optical module in a second area according to an exemplary embodiment of the present disclosure.
Figure 12:
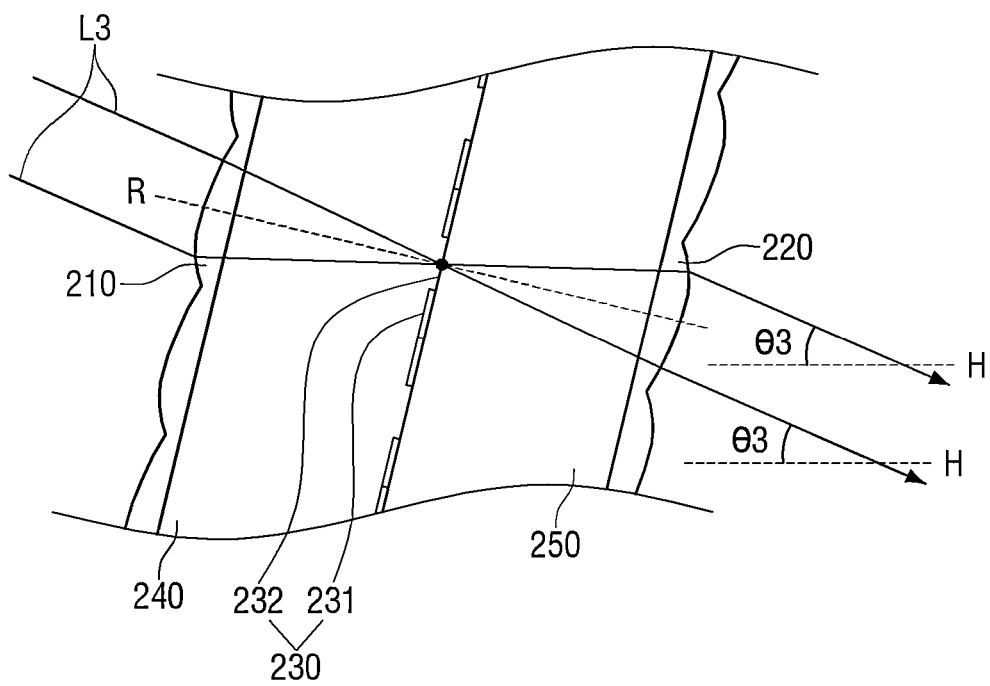
FIG. 12 is a schematic diagram illustrating light outputted from an optical module in a third area according to an exemplary embodiment of the present disclosure.

FIG. 10 is a schematic diagram illustrating light outputted from an optical module of the first area A1 according to an exemplary embodiment of the present disclosure, FIG. 11 is a schematic diagram illustrating light outputted from an optical module of the second area A2 according to an exemplary embodiment of the present disclosure, and FIG. 12 is a schematic diagram illustrating light outputted from an optical module of the third area A3 according to an exemplary embodiment of the present disclosure.

Referring to FIGS. 10 to 12, the optical modules included in each of the first to third areas A1, A2 and A3 among the plurality of optical modules may output light at different angles with respect to the horizontal direction H.

Referring to FIG. 10, an optical module included in the first area A1 among the plurality of optical modules may output light in a direction parallel to a direction in which light is reflected by the first reflector 121. For example, the optical module included in the first area A1 among the plurality of optical modules may cause the light L1 that is obliquely reflected forward and downward at the first angle $\theta 1$ with respect to the horizontal direction H by the first reflector 121 to be obliquely outputted forward and downward while maintaining the first angle $\theta 1$ with respect to the horizontal direction H.

Referring to FIG. 11, the optical module included in the second area A2 among the plurality of optical modules may output light in a direction parallel to a direction in which light is reflected by the second reflector 122. For example, the optical module included in the second area A2 among the plurality of optical modules may cause the light L2 that is obliquely reflected forward and downward at the second angle θ2 with respect to the horizontal direction H by the second reflector 122 to be outputted at the second angle θ2 with respect to the horizontal direction H.

Referring to FIG. 12, an optical module included in the third area A3 among the plurality of optical modules may output light in a direction parallel to a direction, in which light is reflected by the third reflector 123. For example, the optical module included in the third area A3 among the plurality of optical modules may cause the light that is obliquely reflected forward and downward at the third angle θ3 with respect to the horizontal direction H by the third reflector 123 to be outputted at the third angle θ3 with respect to the horizontal direction H.

In the exemplary embodiment of the present disclosure, although a case in which the angle reflected by each of the first to third reflectors 121, 122, and 123 is maintained as the light is outputted from each of the plurality of areas A1, A2 and A3 is described, this is merely an example for helping understanding of the present disclosure, and the present disclosure is not limited thereto. The angle of the light that is reflected by each of the first to third reflectors 121, 122, and 123 and the angle of the light that is outputted from each of the plurality of areas A1, A2 and A3 may be different from each other as long as the magnitude relationship of the angles is same, i.e., the relative inequality relationship (θ1<θ2<θ3) is maintained between the angles before and after the optical modules.

In this case, the optical module included in the first to third areas A1, A2, and A3 may be formed with different shapes in terms of at least one of the incident lens or the output lens so that the light reflected by the first to third reflectors 121, 122, and 123 and incident thereto can be outputted at different angles. Here, the description that the shapes of at least one of the incident lens or the output lens are different may mean that properties of the lens that may affect the path of light, such as curvature, size, thickness, etc., are different.

For example, when the optical unit 200 is arranged to be inclined at the first angle θ1, the incident lens 210 and the output lens 220 of the optical module included in the first area A1 may be formed so that both sides are symmetrical to each other with respect to the reference line R having the angle of θ1 with respect to the horizontal direction H, and the incident lens 210 and the output lens 220 of the optical module included in the second and third areas A2 and A3 may be formed so that both sides are asymmetrical in at least one direction with respect to the reference line R having an angle of θ1 with respect to the horizontal direction H, and thus the light outputted from the optical module included in the plurality of areas A1, A2, and A3 may have different angles.

In this case, in the exemplary embodiment of the present disclosure, that the incident lens and the output lens are asymmetrically formed may be understood as that at least one of the sizes, lengths, and curvatures of both sides (e.g., upper and lower halves with respect to the reference line R or left and right halves with respect to the reference line R) are different from each other in at least one direction with respect to the reference line R (i.e., non-axisymmetric).

In the exemplary embodiment of the present disclosure, the incident lens 210 and the output lens 220 of the optical module included in at least one of the plurality of areas A1, A2, and A3 may be formed asymmetrically in the vertical direction with respect to the reference line R. However, the present disclosure is not limited thereto, and the incident lens 210 and the output lens 220 of the optical module included in at least one of the plurality of areas A1, A2, and A3 may be asymmetrically formed in a vertical direction, a left-right direction (e.g., a horizontal direction), or a combination thereof with respect to the reference line R.

Figure 13:
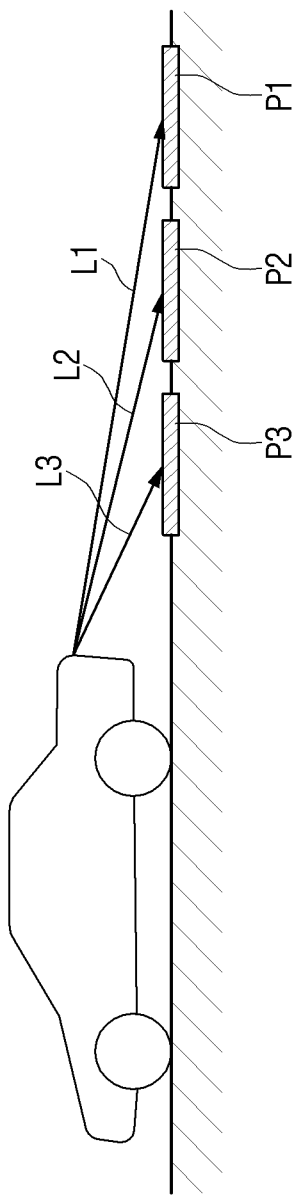
FIG. 13 is a schematic view showing a light irradiation pattern formed by a vehicle lamp according to an exemplary embodiment of the present disclosure.

As described above, when the angles of light that is outputted from each of the first to third areas A1, A2, and A3 are different from one another, the positions at which the lights L1, L2 and L3 outputted from each of the first to third areas A1, A2, and A3 are irradiated may be different from one another, as shown in FIG. 13. Since the angles θ1, θ2, and θ3 at which the light is outputted with respect to the horizontal direction H may gradually increase from the first area A1 to the third area A3, as described above, the light irradiation pattern formed by the vehicle lamp 1 of the present disclosure may include a plurality of pattern images P1, P2, and P3 that are projected by the light L1, L2, and L3 outputted from the first to third areas A1, A2, and A3, respectively.

Figure 14:
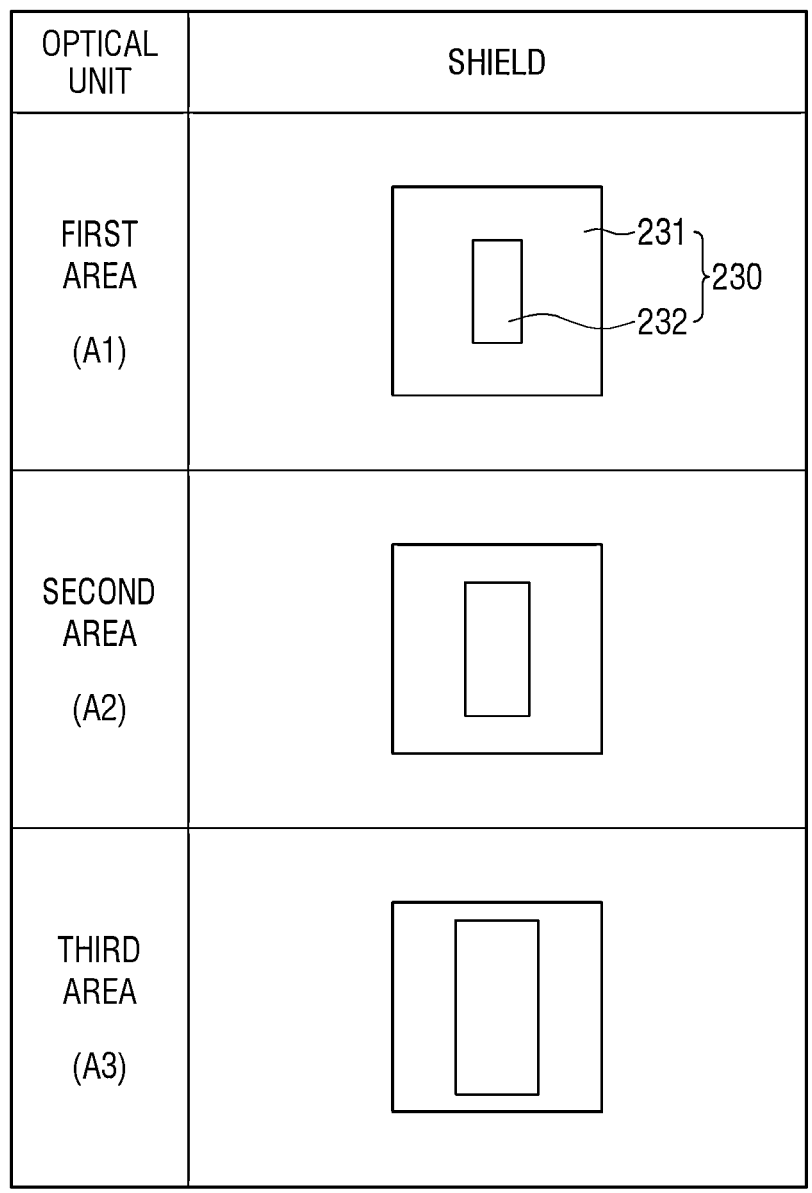
FIG. 14 is a schematic diagram illustrating a shield of each of a plurality of areas of an optical unit according to an exemplary embodiment of the present disclosure.

FIG. 14 is a schematic diagram illustrating a shield of each of a plurality of areas of an optical unit according to an exemplary embodiment of the present disclosure. Referring to FIG. 14, the plurality of shields 230 may include a blocking area 231 for blocking light and a transmission area 232 for transmitting light, such that the shape and/or size of the pattern image may be defined according to the shape and/or size of the transmission area 232.

Here, in case the sizes of the transmission area 232 are equal for the plurality of shields 230 included in the areas A1, A2, and A3, the pattern image projected on the road surface by the light irradiated to the farthest from the vehicle may become larger than the pattern image projected on the road surface by the light irradiated to the closest from the vehicle due to light diffusion. As such, the sizes of the transmission area 232 may be made differently for the plurality of shields 230 in the first to third areas A1, A2, and A3 to allow the plurality of pattern images to have substantially the same size even if positions of projected pattern images are different.

FIG. 14 is an example where the size of the transmission area 232 is the smallest in the shield belonging to the first area A1 since the light outputted from the first area A1 is irradiated to the farthest from the vehicle, and the size of the transmission area 232 is the largest in the shield belonging to the third area A3 since the light outputted from the third area A3 is irradiated at the closest distance. However, the present disclosure is not limited thereto, and the shape and/or size of the transmission area of the shield of the optical module belonging to the first to third areas A1, A2, and A3 among the plurality of optical modules may vary based on the position of forming the pattern image by the light outputted from the first to third areas A1, A2, and A3.

On the other hand, as the position at which the light outputted from each of the first to third areas A1, A2, and A3 is irradiated is farther from the vehicle, the size of the pattern image may be increased due to light diffusion, whereas the brightness of the pattern image may be decreased. Therefore, there is a possibility that a plurality of pattern images included in the light irradiation pattern formed by the vehicle lamp 1 of the present disclosure may have different brightness as well as sizes.

Accordingly, in the exemplary embodiment of the present disclosure, the focal points of the incident lens for the optical modules included in the first to third areas A1, A2, and A3 may be placed at different positions relative to the corresponding shields so that even when the positions at which the light outputted from each of the first to third areas A1, A2, and A3 is irradiated have different distances from the vehicle, they may have a substantially uniform size and brightness.

FIG. 15 is a schematic diagram illustrating the focal points of incident lenses of the plurality of areas of the optical unit 200 according to an exemplary embodiment of the present disclosure. Referring to FIG. 15, since the first area A1 allows the light to be irradiated to the farthest from the vehicle, the light irradiation distance is relatively long so that the size of the projected pattern image increases, whereas the brightness of the pattern image decreases. Therefore, the focal point F1 of the incident lens belonging to the first area A1 may be disposed near or slightly in front of the shield 230 to better concentrate the light. Further, since the third area A3 allows light to be irradiated at the position closest to the vehicle, the light irradiation distance is relatively short so that the size of the projected pattern image decreases, whereas the brightness becomes relatively high. Therefore, the size of the pattern image may be increased by locating the focal point F3 of the incident lens belonging to the third area A3 more forward compared to the optical modules in other areas. In other words, the size and brightness of the pattern image formed by the light outputted from each of the first to third areas A1, A2 and A3 may become more uniform by positioning the focal point F2 of the incident lens of the second area A2 between the focal point F1 of the incident lens of the first area A1 and the focal point F3 of the incident lens of the third area A3.

While the present disclosure has been particularly shown and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A lamp for a vehicle comprising:
    a light emitting unit for generating light; and
    an optical unit for forming a predetermined light irradiation pattern by outputting the light incident from the light emitting unit through a plurality of optical modules each including an incident lens and an output lens,
    wherein the light emitting unit comprises:
        one light source unit; and
        a plurality of reflectors arranged in a left-right direction to allow the light generated from the one light source unit to be reflected to the optical unit, wherein the light from the one light source unit is incident to and reflected by the plurality of reflectors,
    wherein the optical unit comprises:
        a plurality of areas for outputting the light incident from the plurality of reflectors,
    wherein the plurality of reflectors reflect the light in a relatively downward direction with respect to a horizontal direction to allow reflected lights to form a plurality of pattern images on a road surface around the vehicle, and
    wherein light outputted through an area closest to the one light source unit among the plurality of areas of the optical unit is projected on the road surface to form a pattern image that is projected farthest from the vehicle among the plurality of pattern images.

2. The vehicle lamp of claim 1, wherein each of the plurality of reflectors reflects the light generated from the one light source unit to become parallel light.

3. The vehicle lamp of claim 1, wherein reflection directions of lights reflected by the plurality of reflectors have different inclination angles with respect to a horizontal direction.

4. The vehicle lamp of claim 3, wherein a first light that is irradiated farther from the vehicle than a second light among the lights reflected by the plurality of reflectors forms an angle with respect to the horizontal direction smaller than an angle formed by the second light.

5. The vehicle lamp of claim 1, wherein an optical module among the plurality of optical modules included in the plurality of areas outputs the light in a direction parallel to a direction in which the light is reflected by a corresponding reflector among the plurality of reflectors.

6. The vehicle lamp of claim 1, wherein incident lenses of at least some of the plurality of optical modules included in the plurality of areas have focal points formed at different positions.

7. The vehicle lamp of claim 1, wherein the plurality of areas are arranged in the left-right direction in accordance with an arrangement direction of the plurality of reflectors.

8. The vehicle lamp of claim 1, wherein the one light source unit generates the light in a relatively upward direction with respect to the horizontal direction.

9. The vehicle lamp of claim 1, wherein shapes of at least one of the incident lens or the output lens of at least some of the plurality of optical modules included in the plurality of areas are different in at least one direction with respect to a reference line.

10. The vehicle lamp of claim 1, wherein each of the plurality of optical modules further comprises a shield disposed between the incident lens and the output lens to obstruct at least some of the light incident to the incident lens from being transmitted to the output lens.

11. The vehicle lamp of claim 10, wherein a first incident lens of a first optical module included in one of the plurality of areas has a focal point formed at a different position in a front-rear direction with respect to the shield than a second incident lens of a second optical module included in another of the plurality of areas.

12. The vehicle lamp of claim 11, wherein the first incident lens of the first optical module that irradiates the light at a closer distance from the vehicle than the second optical module that irradiates the light at a farther distance from the vehicle has the focal point formed at a position having a greater distance forward with respect to the shield than the second incident lens.

13. The vehicle lamp of claim 10, wherein the shield included in each of the plurality of optical modules comprises:
    a blocking area to obstruct the at least some of the light; and
    a transmission area to transmit at least some of a remainder of the light.

14. The vehicle lamp of claim 13, wherein the transmission area of a first shield included in a first optical module allowing the light to be irradiated at a closer distance from the vehicle than a second optical module allowing the light to be irradiated at a farther distance from the vehicle is larger than the transmission area of a second shied included in the second optical module.

15. The vehicle lamp of claim 1, wherein an optical axis of the one light source unit and an optical axis of the optical unit are substantially perpendicular to each other.

\* \* \* \* \*